US007890854B2

(12) United States Patent
Chasen et al.

(10) Patent No.: US 7,890,854 B2
(45) Date of Patent: Feb. 15, 2011

(54) WEB MEDIA ASSET IDENTIFICATION SYSTEM AND METHOD

(75) Inventors: Jeffrey Martin Chasen, Seattle, WA (US); Jeffrey D. Leitner, Shoreline, WA (US)

(73) Assignee: RealNetworks, Inc., Seattle, WA (US)

( * ) Notice: Subject to any disclaimer, the term of this patent is extended or adjusted under 35 U.S.C. 154(b) by 853 days.

(21) Appl. No.: 11/756,588

(22) Filed: May 31, 2007

(65) Prior Publication Data

US 2008/0301280 A1    Dec. 4, 2008

(51) Int. Cl.
G06F 17/00 (2006.01)
(52) U.S. Cl. ......................... 715/234; 715/205; 715/255
(58) Field of Classification Search ......... 715/205–208, 715/234, 237, 255, 249
See application file for complete search history.

(56) References Cited

U.S. PATENT DOCUMENTS

| 6,708,217 | B1* | 3/2004 | Colson et al. ............... 709/231 |
| 6,964,009 | B2* | 11/2005 | Samaniego et al. ......... 715/202 |
| 7,165,213 | B1* | 1/2007 | Busey ......................... 715/205 |
| 7,363,363 | B2* | 4/2008 | Dal Canto et al. ........... 709/223 |
| 2002/0147840 | A1* | 10/2002 | Mutton et al. ............... 709/239 |
| 2002/0161824 | A1* | 10/2002 | Harris ......................... 709/202 |
| 2004/0044785 | A1* | 3/2004 | Bell et al. .................... 709/238 |
| 2005/0005028 | A1 | 1/2005 | Huang |
| 2005/0028079 | A1* | 2/2005 | Dinh et al. ............... 715/501.1 |
| 2008/0126191 | A1* | 5/2008 | Schiavi ......................... 705/14 |
| 2008/0183804 | A1* | 7/2008 | Hassett et al. ............... 709/203 |

FOREIGN PATENT DOCUMENTS

WO    0186456 A1    11/2001

* cited by examiner

*Primary Examiner*—Thu Huynh
(74) *Attorney, Agent, or Firm*—Aeon Law; Adam L.K. Philipp

(57) ABSTRACT

Methods of dynamically identifying a server provided media asset on a client device are provided herein.

12 Claims, 10 Drawing Sheets

WEB MEDIA ASSET IDENTIFICATION SYSTEM AND METHOD

FIELD

The present invention relates to online content, and more particularly for a method of identifying and providing download links to media assets in a rendered web page.

BACKGROUND

The Internet is a worldwide, publicly accessible network of interconnected computer networks that transmit data by packet switching using the standard Internet Protocol ("IP"). The "network of networks" consists of many smaller domestic, academic, business, and government networks that together enable various services, such as electronic mail, online chat, file transfer, and the interlinked web pages and other documents of the World Wide Web.

It has become very popular to distribute video and audio over the Internet. Especially since broadband Internet access has become more common, media clips are often embedded in or linked to web pages. Currently, there are a multitude of media clips available online, with new websites frequently springing up offering online media to users. One of the most popular of these sites is YouTube, provided by Google, Inc. of Mountain View, Calif., which features both media produced by established media sources and also media produced by small groups and amateurs. Between March and July of the year 2006, YouTube alone grew from 30 to 100 million views of videos per day.

In addition to dedicated video sharing sites such as YouTube, many existing radio and television broadcasters provide Internet 'feeds' of their live audio and video streams (for example, the British Broadcasting Service). Broadcasters may also allow users to time-shift their viewing or listening.

Because there are so many websites providing online media, an Internet-connected device, such as a computer, game console, set-top box, handheld computer, cell phone, or other device, can be used to access on-line media in much the same way as was previously possible only with a television or radio receiver.

One of the most common formats used to distribute media on the Internet is the Flash Video or FLV format. Other common formats include Windows Media Video, RealMedia, Quicktime, and DivX. Online media encoded in many of these formats, including Flash Video, either can be streamed to a web browser or other client for online viewing, or they can be downloaded to a storage device. Many users prefer to download pieces of media rather than stream them for a variety of reasons: a user may prefer to watch or listen to the media at a time when he or she may be offline; a user may prefer to archive a copy so that he or she will be able to watch or listen to the media in the future even if the website currently hosting it goes down; a user may prefer to share the file itself with others, rather than share a link to the file; or a user may prefer to download the media for a myriad of other reasons.

There are many ways to download media content from a web site. If the site provides a direct link to the file on the rendered page, downloading a media file may be as easy as right-clicking and selecting "Save Link As . . . " or some similar command. There are also well-known methods for extracting explicit links from the HTML source of a web page, even if a web site does not render a direct link. However, it is a common practice for websites to make it difficult for users to download media files. One technique to make downloads difficult is to link to or embed a "wrapper" in a web page rather than directly linking to or embedding a media clip. Common examples of media wrappers include JavaScript media players, Flash media players, ActiveX media players, VBScript players, and the like.

JavaScript is the name of the Mozilla Foundation's (of Mountain View, Calif.) implementation of the ECMAScript standard, a scripting language based on the concept of prototype-based programming. The language is best known for its use in websites (as client-side JavaScript), but is also used to enable scripting access to objects embedded in other applications.

Adobe Flash, or simply Flash, refers to the Adobe Flash Player from Adobe Systems Inc. of San Jose, Calif. The Flash Player is a client application available in most common web browsers. It features support for vector and raster graphics, a scripting language called ActionScript and bi-directional streaming of audio and video. There are also versions of the Flash Player for mobile phones and other non-PC devices such as Internet Tablets, personal digital assistants, the Kodak Easyshare One camera from Eastman Kodak Co. of Rochester, N.Y., and the Playstation Portable, From Sony Corporation of Japan, among others.

ActiveX is a term that is used to denote reusable software components that are based on the Microsoft Component Object Model (COM) from Microsoft Corp. of Redmond, Wash. ActiveX controls provide encapsulated reusable functionality to programs and they are typically but not always visual in nature. Example ActiveX controls include: Adobe Reader and Adobe Flash Player from Adobe Systems Inc. of San Jose, Calif.; QuickTime Player from Apple Inc. of Cupertino, Calif.; Microsoft Windows Media Player from Microsoft Corp. of Redmond, Wash.; RealPlayer from RealNetworks, Inc. of Seattle, Wash., and Java Virtual Machine from Sun Microsystems, Inc. of Santa Clara, Calif.

VBScript (short for Visual Basic Scripting Edition) is an Active Scripting language interpreted via Windows® Script Host from Microsoft Corp. of Redmond, Wash. When employed in Microsoft Internet Explorer, VBScript is very similar in function to JavaScript—it processes code embedded in HTML. VBScript can also be used to create stand-alone HTML applications (file extension .hta).

Popular web sites such as YouTube, Vimeo, and Grouper currently make use of wrappers to obfuscate media assets. There are methods known in the art to download media assets that are obfuscated behind a wrapper, but existing methods all fall short in a number of ways.

One known method identifies media assets by comparing the content on a given web page with a catalog detailing the technical methods used by certain web sites to obfuscate media assets. If the web page in question is hosted by a known web site, then this method may be able to identify and allow the user to download a media asset that is obfuscated on that page. For example, the catalog might allow one to deduce that the web page http://hiddenvids.com/video/foo would contain a video asset located at http://secret.hiddenvids.com/video/foo.mpg. This method may be implemented on a client, for example, as a browser plug-in, or it may be implemented using a proxy server that serves as an intermediary between the client and the target web site.

Disadvantages to this method include the facts that it requires that each individual web site be cataloged and that it requires each individual catalog entry to be continually monitored so that it can be updated when the web site operator changes its obfuscation strategy. For example, this method would have no way of discovering media assets on a new web site until that site's obfuscation schemes were analyzed and input into the catalog. In addition, this method would fail to identify media assets even on known web sites if the web site operator changes its obfuscation scheme in even a simple way such as changing the name of the host that stores the media assets.

Another known method is "stream ripping." Using this method, a client intercepts the data stream corresponding to a streaming media asset, allowing the user to redirect that data to a file on a storage medium. One disadvantage to this method is that the media asset may be streamed in real time, meaning that it would take up to thirty minutes to capture a thirty minute media asset.

DESCRIPTION

Figure 1:
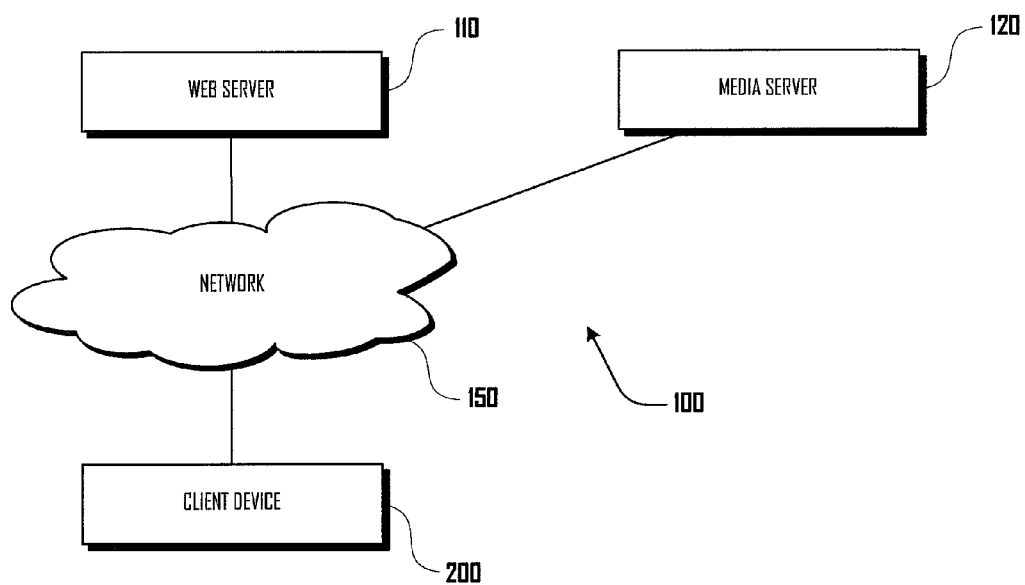
FIG. 1 is a system diagram of a number of devices in a network in accordance with one embodiment.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file Servers, computer Servers and memory storage devices. Each of these conventional distributed computing components is accessible by the processor via a communication network.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Users would like to be able to download media content even from web sites that take steps to obfuscate media assets. Embodiments described herein overcomes deficiencies in existing methods by providing a media asset identification routine that can analyze the communication between the browser and a web server to identify media assets, whether obfuscated or not, and associate media assets with a particular web page element.

FIG. 1 illustrates an example operating environment 100 where a client device 200 (illustrated in FIG. 2 and described below) uses a network 150 (e.g., the Internet or the like) to access a web page that is hosted on a web server 110 and that contains references to media assets that are hosted on a media server 120, which is also reachable on the network 150. In alternate embodiments, the web server 110 and the media server 120 may be a single device, or the client device 200 and the web server 110 may be a single device. Additionally, multiple web servers 110 may all access a single media server 120; a single web server 110 may access multiple media servers 120; multiple web servers 110 may access multiple media servers 120; or any other combination thereof. Multiple client devices 200 may also be present.

Figure 2:
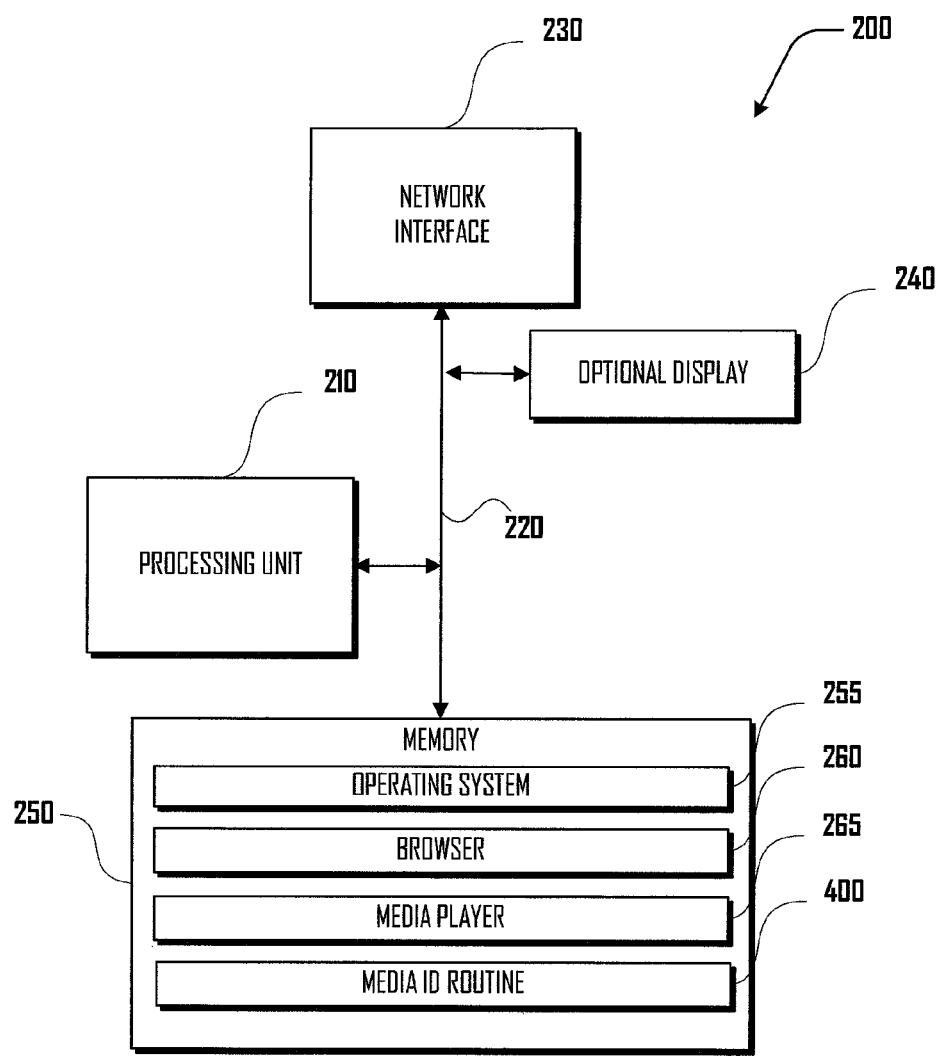
FIG. 2 is a block diagram of an appliance that provides an exemplary operating environment for one embodiment.

FIG. 2 illustrates several components of an exemplary client device 200. In some embodiments, the client device 200 may include many more components than those shown in FIG. 2. However, it is not necessary that all of these generally conventional components be shown in order to disclose an illustrative embodiment. As shown in FIG. 2, the client device 200 includes a network interface 230 for connecting to the network 150. Those of ordinary skill in the art will appreciate that the network interface 230 includes the necessary circuitry for such a connection and is constructed for use with an appropriate protocol.

The client device 200 also includes a processing unit 210, a memory 250 and may include an optional display 240, all interconnected along with the network interface 230 via a bus 220. The memory 250 generally comprises a random access memory ("RAM"), a read only memory ("ROM"), and a permanent mass storage device, such as a disk drive or flash drive. The memory 250 stores program code for a web browser 260, media player 265, and the media asset identification routine 270. In addition, the memory 250 also stores an operating system 255. It will be appreciated that these software components may be loaded from a computer readable medium into memory 250 of the client device 200 using an input mechanism (not shown) associated with a computer readable medium, such as a floppy disc, tape, DVD/CD-ROM drive, memory card, via the network interface 230 or the like.

Although an exemplary client device 200 has been described that generally conforms to a conventional general purpose computing device, those of ordinary skill in the art will appreciate that a client device 200 may be any of a great number of devices capable of communicating with the network 150, for example, a personal computer, a game console, a set-top box, a handheld computer, a cell phone, or any other device that is capable of accessing on-line media and that is capable of running a media asset identification routine 400 in conjunction with displaying web pages.

Figure 3:
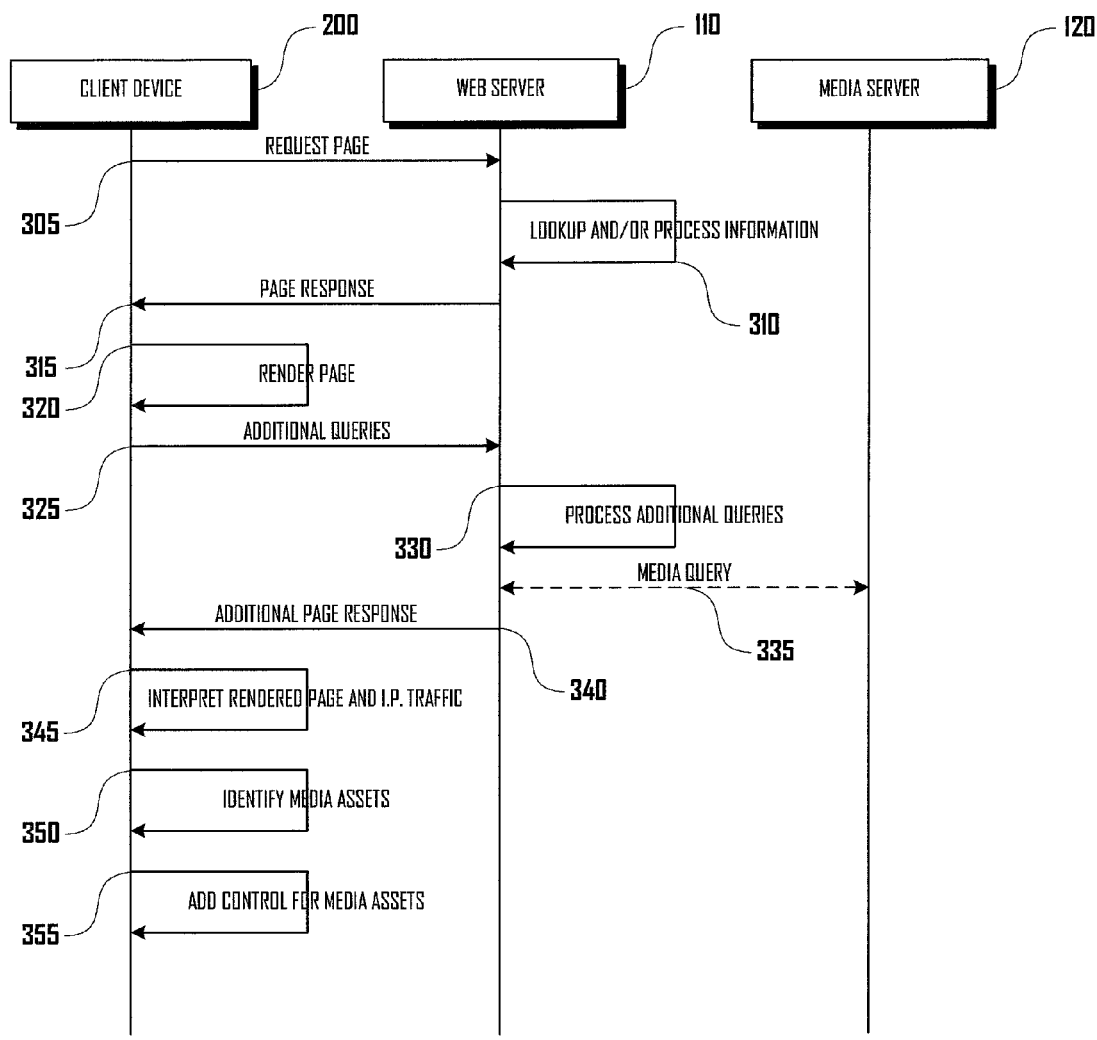
FIG. 3 is a data flow diagram illustrating the relationships between various devices in accordance with one embodiment.

FIG. 3 depicts the relationships between and actions performed by a client device 200, a web server 110, and a media server 120 in an example embodiment.

Initially, a user may visit a web page that contains one or more media assets. After the user navigates to the page in the browser 260, the client device 200 requests 305 that page from the appropriate web server 110. On receiving that request 305, the web server 110 locates 310 the requested page in its memory and/or otherwise processes the request 305 so that it can respond 315 to the client device's request 305. The web server 110 responds 315 to the client device's request 305 by transmitting at least an initial set of data that the client device 200 uses in order to render 320 the page in the browser. The client device 200 then begins to render 320 the requested page.

Rendering 320 the page may often involve client device's 200 requesting 325 additional data from the web server 110. For example, if the requested page includes a media assets, such as an images, or an obfuscated media asset, the client may make additional requests 325 to the web server 110 for additional data to allow the browser 260 to render the page. On receiving these additional requests, the web server 110 will process 330 the requests, and if the requested data is located on the media server 120, the web server 110 will request 335 that data from the media server 120. The web server 110 will then transmit 340 the requested information back to the client device 200.

During this rendering process, the media asset identification routine 400 (illustrated in FIG. 4 and described below) is able to interpret 345 the rendered page and analyze the communications between the client device 200 and the web server 110 in order to identify 350 media assets. If any media assets are found, the client device 200 will add 355 a control or tag for the media assets to the rendered web page.

Figure 4:
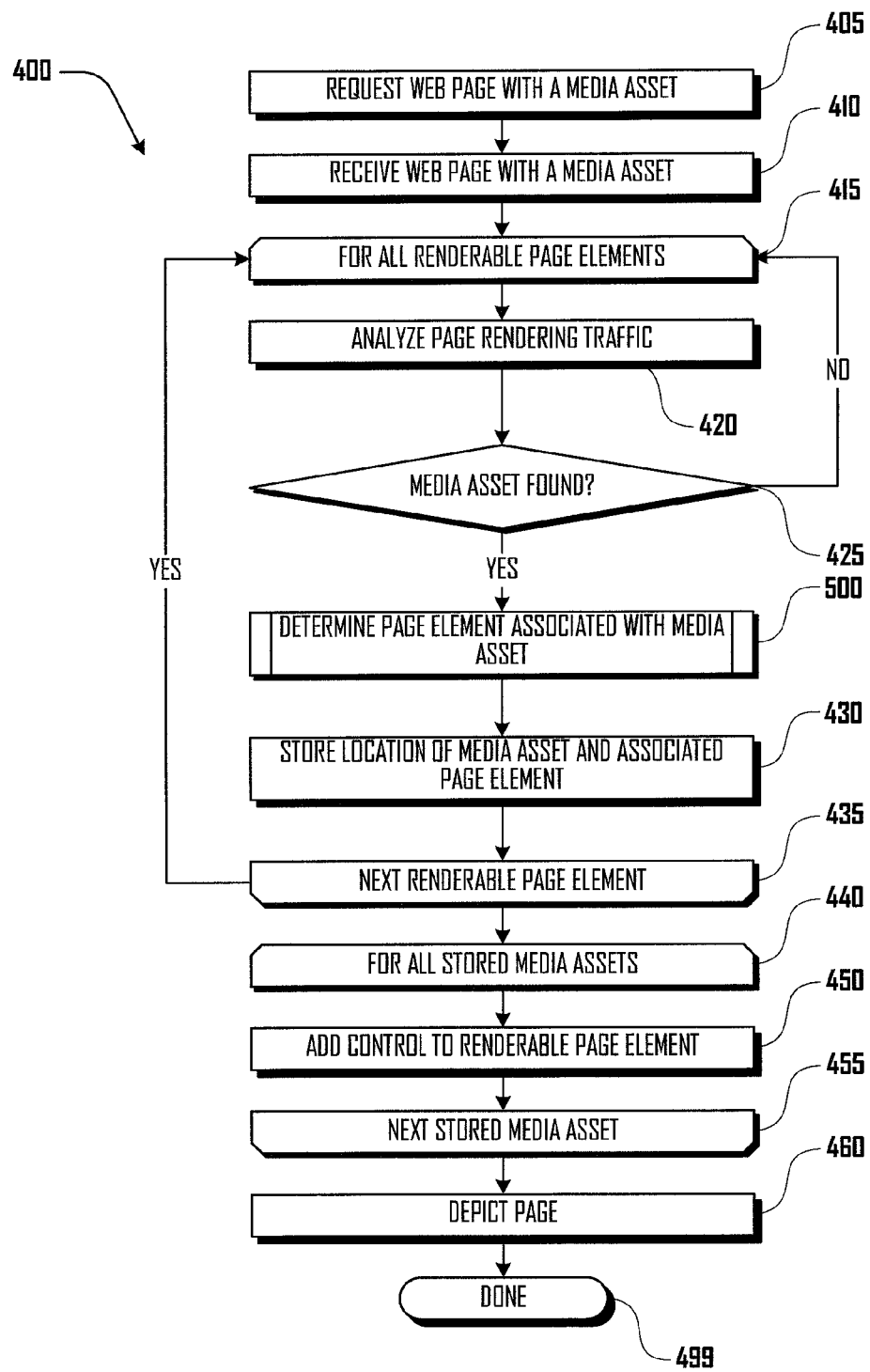
FIG. 4 is a flow diagram illustrating a media asset identification routine in accordance with one embodiment.

The media asset identification process just described that takes place on the client device 200 is detailed in FIG. 4, which illustrates an exemplary flow diagram of a media asset identification routine 400. Routine 400 begins at block 405, where the browser 260 requests a web page that may contain one or more media assets. In block 410, the requested web page is received, and in looping block 415, routine 400 begins to analyze each page element that may be rendered. The page elements may be represented by a DOM (Document Object Model—a platform- and language-independent standard object model for representing HTML or XML and related formats), in which case, the media asset identification routine 400 would operate by traversing the DOM. In alternate methods, the page elements may be iterated through in some other suitable fashion.

In block 420, routine 400 analyzes the communications traffic between the client device 200 and the web server 110 for rendering the requested page, looking for media-indicative traffic. In decision block 425, routine 400 determines whether a media asset is found in the analyzed traffic. A media asset may be identified by examining the Multipurpose Internet Mail Extensions ("MIME") type of an element to determine whether that element is of a type that will be handled by a media player. MIME is an Internet Standard that, among other things, includes a method to register content types and associate them with handler applications. The specifics of MIME are detailed in RFC 2045, which is incorporated herein in its entirety.

If no media asset is found in decision block 425, processing cycles back to looping block 415, where the next renderable page element is analyzed. If a media asset is located in decision block 425, subroutine block 500 (illustrated in FIG. 5 and described below) performs additional processing to associate a renderable page element with the media asset.

Next, in block 430, routine 400 stores the location of the identified media asset and its determined associated page element. If there are additional renderable page elements to analyze, looping block 435 cycles processing back to looping block 415; if not, looping block 435 directs processing to block 440.

Beginning in looping block 440, all media assets that were stored in block 430 are processed. In block 450, routine 400 adds a control or "tag" associated with a stored page element that is associated with an identified media asset. In some cases, such a tag may be visual indication that will be rendered along with the page element, a visual indication such as an image or a text link. The link may contain a Uniform Resource Identifier ("URI") that identifies or names the media asset. In other cases, such tag may comprise adding a selectable item to a menu (e.g., a "right-click" menu) associated with the page element.

Adding a command to such a menu may involve "hooking" into a browser's API An application programming interface ("API") is a source code interface that a computer system or program library provides to support requests for services to be made of it by a computer program. "Hooking" is a technique employing so called "hooks" to make a chain of procedures as a handler. Thus, after the handled event occurs, control flow follows the chain in specific order. The new hook registers its own address as handler for the event and is expected to call the original handler at some point, usually at the end. "Import Table Patching" is one suitable method of API hooking usable by some embodiments. In the Windows® operating system from Microsoft Corp. of Redmond, Wash., most applications and modules have a so-called "import table," which may include a list of APIs that the application or module calls. Other operating environments may include similar techniques for hooking into an application suited for rendering page elements.

If there are additional stored page elements, looping block 455 will cycle processing back to looping block 440; if not, looping block 455 directs processing to block 460. Block 460 renders the depiction of the page in the browser 260 and processing ends at block 499.

The media asset identification routine 400 could also be adapted to prospectively identify renderable media assets on web pages that the current web page provides links to. For example, a web page may contain a list of links to web pages that contain renderable media assets. By adapting the media asset identification routine 400 to retrieve data from each linked page and to "virtually" render that data (processing the data as if it were to be rendered without presenting the results to the user) in order to identify media assets contained therein, the user could advantageously be presented with controls that could allow the user to download media assets from many pages without having to visit each individual page, controls that may reduce any delay in adding a control to a media asset on a page that the user navigates to.

In a hybrid approach, another alternate embodiment may process links to other web pages only after a current web page has been analyzed and rendered, i.e., during a browser's idle time.

Figure 5:
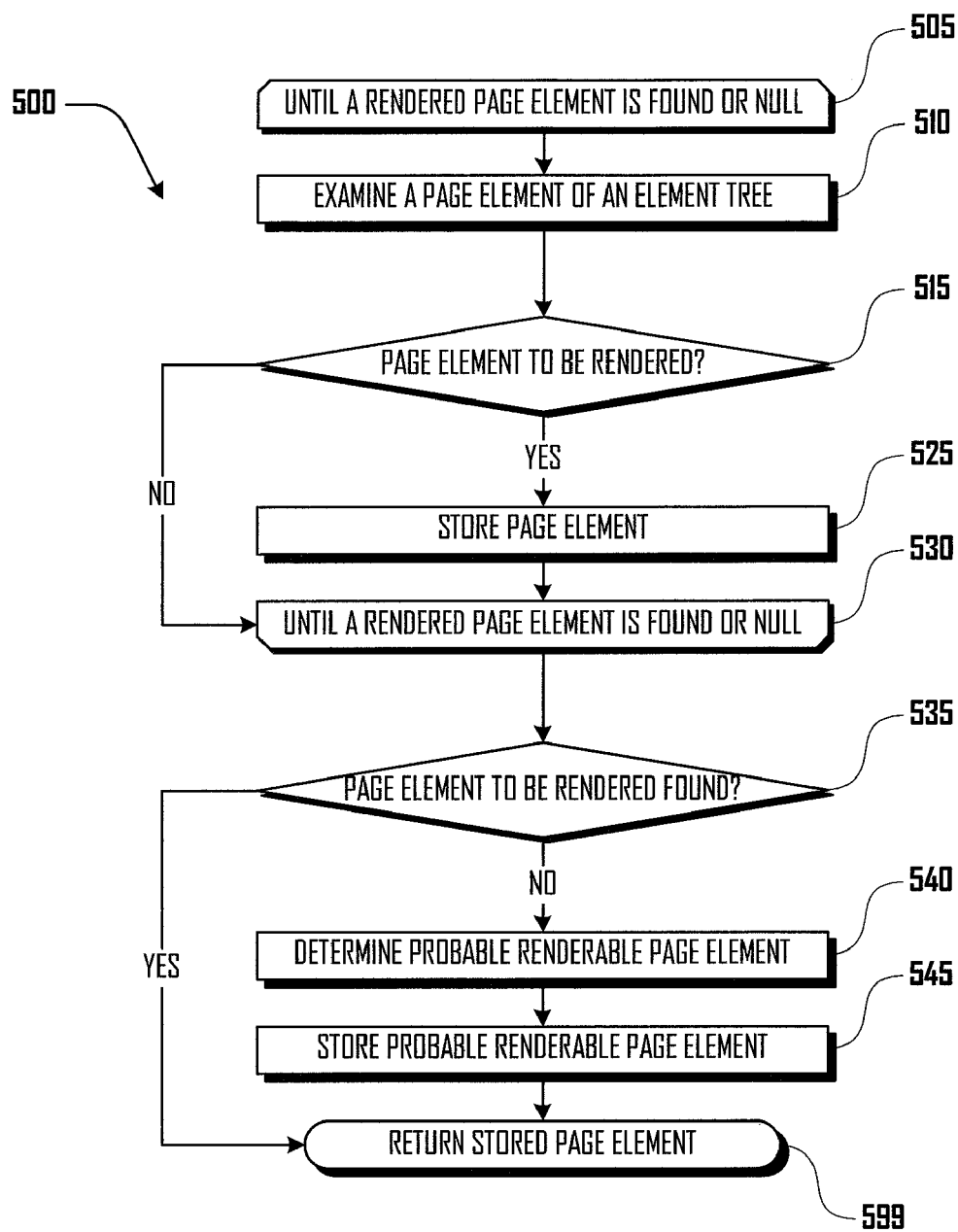
FIG. 5 is a flow diagram illustrating a media asset page element association subroutine in accordance with one embodiment.

FIG. 5 illustrates an exemplary flow diagram of a subroutine 500 that determines which renderable page element is associated with an identified media asset. Subroutine 500 may be employed when the association between renderable page elements and media assets is not clear. For example, a Flash media asset may consist of multiple audio clips, video clips, images, or other pieces of media. In one example scenario, a Flash media asset may consist of a first video clip, which may be an advertisement, and a second video clip, which may be the piece of video that the user wants to watch. In looping block 505, subroutine 500 begins to iterate over each page element in the element tree associated with the identified media asset. In block 510, a current page element is examined so that in decision block 515, it can be determined whether the page element is one that will be rendered. If the page element is not to be rendered (for example, because the page element is invisible or is merely a hidden link) then processing is directed to looping block 530, which sets the page element to be examined to the next page element and cycles processing back to looping block 505 so that the next page element may be examined. If decision block 515 finds that the page element is to be rendered, then block 525 stores the page element before looping block 530 returns processing to looping block 505 so that the next page element may be examined.

Once all page elements have been examined, in block 535, subroutine 500 determines whether a page element that is to be rendered has been stored. If so, processing is directed to return block 599, which returns the stored page element to the calling routine. If blocks 505-530 did not identify and store a page element to be rendered, then processing is directed to block 540. In block 540, subroutine 500 determines which page elements will be rendered by examining their characteristics. For example, the size of a page element may indicate that it is likely one that will be rendered. Block 545 stores a page element identified as being probably rendered. In return block 599, the stored page element is returned to the media asset identification routine 400.

Figure 6:
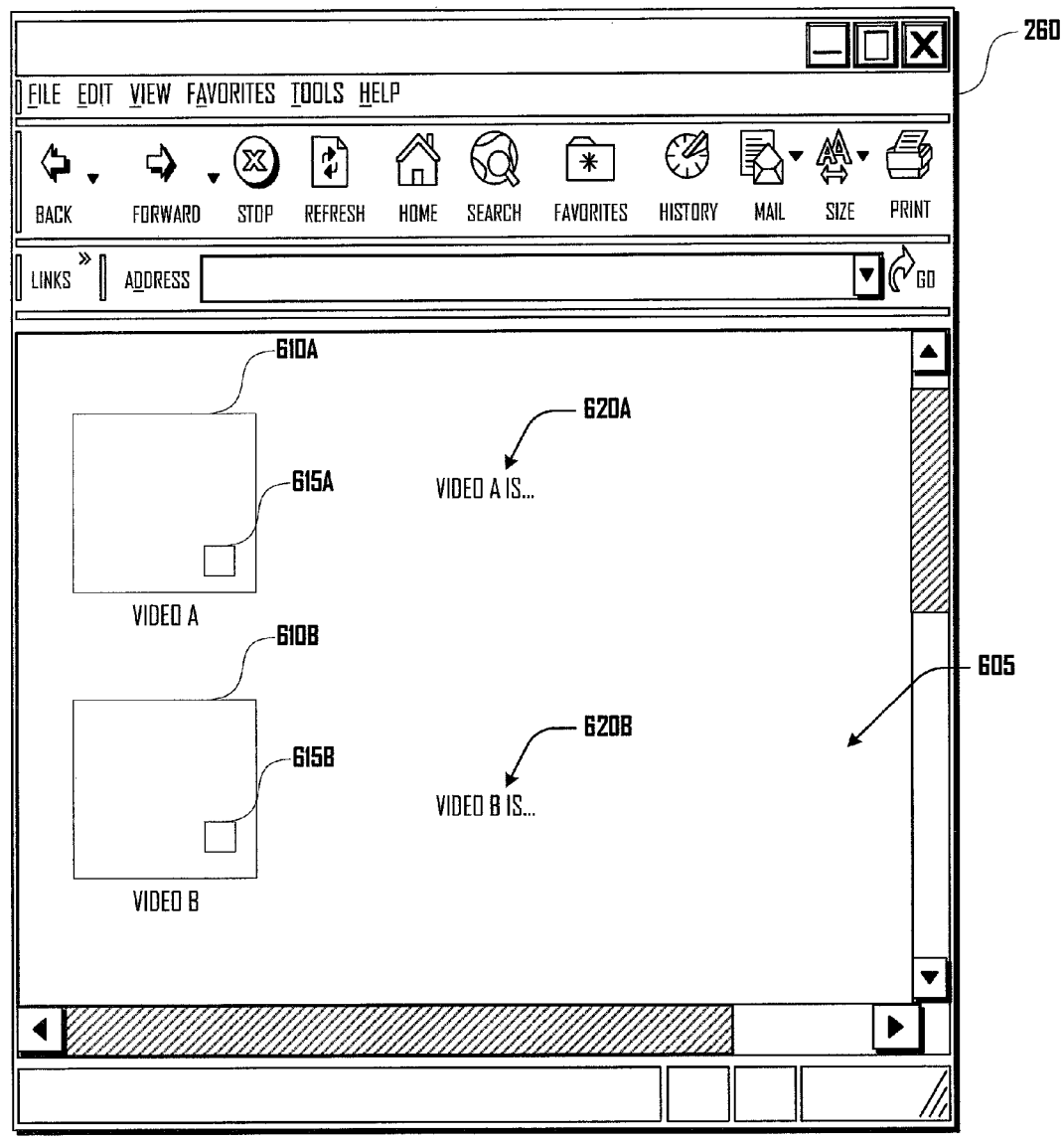
FIG. 6 is an illustration of a web page with a media asset tagged via a visual indication in accordance with one embodiment.

FIG. 6 illustrates an exemplary web page 605 displayed in a browser 260 in accordance with one embodiment. Page elements 610A-B have been determined to be associated with media assets. In this embodiment, a visual interface element 615A-B is used to tag page elements 610A-B that have been determined to be associated with identified media assets. In some embodiments, the visual tags may comprise URIs for their respective associated media assets. A visual tag may also comprise a link or a similar interface that the user may use to trigger an action, such as opening or linking to the URI of a media asset, or the like. In some embodiments, visually indicative tags 615A-B may comprise images placed on the determined page elements 610A-B. Not only could a visually indicative tag 615A-B notify the user that a media asset has been identified and determined to be associated with a particular page element, but a visually indicative tag 615A-B could also notify the user whether that media asset is currently available. For example, if a media asset has been identified and determined to be associated with a particular URI, the visually indicative tag 615A-B might be a red image if the URI is not currently accessible or a green image if the URI is currently accessible. In alternate embodiments, the visually indicative tags may comprise text links 620A-B added to text associated with the media asset, text such as a textual description of the content of the media asset, the name of the media asset, or the like.

Figure 7:
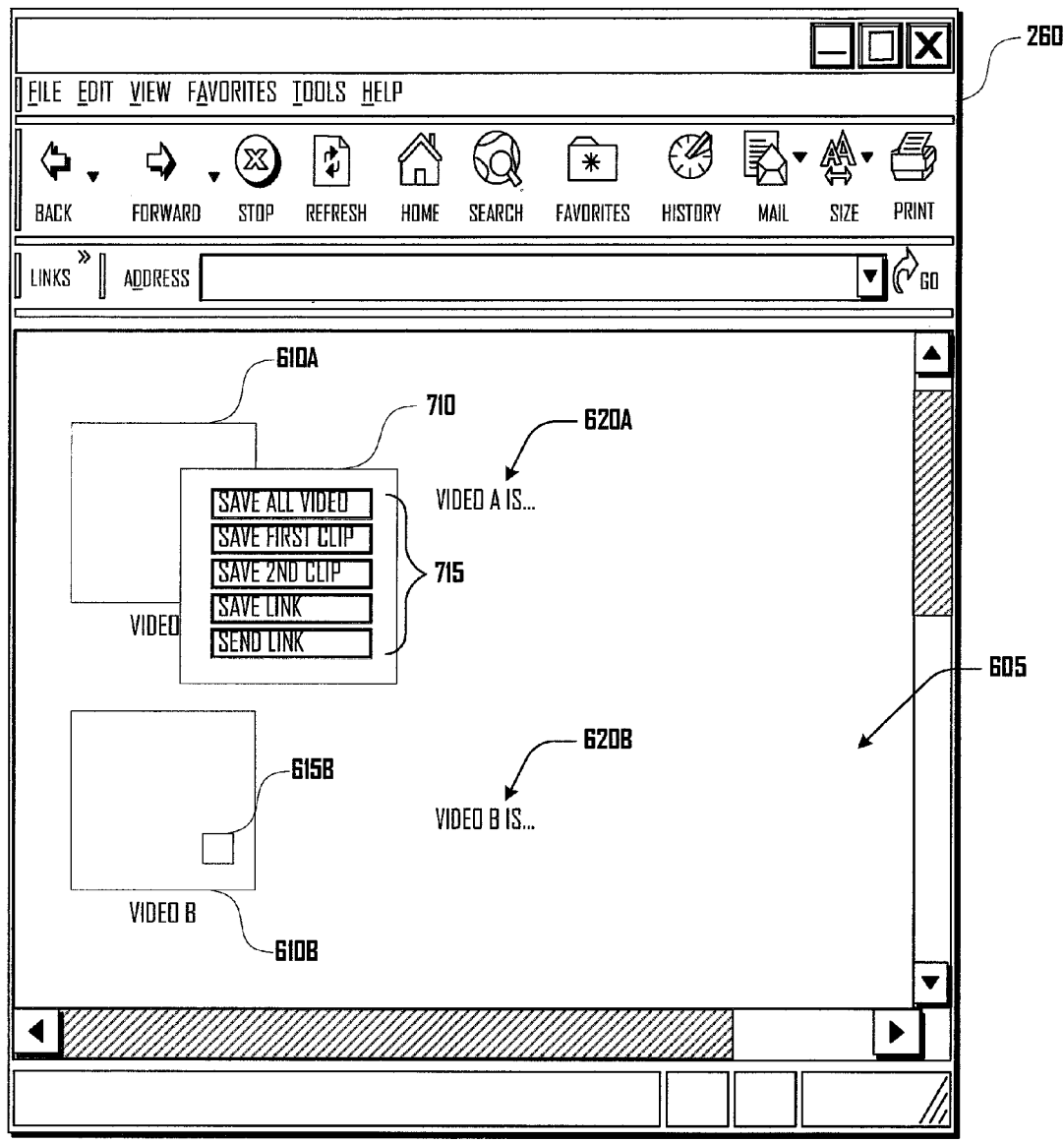
FIG. 7 is an illustration of a web page with a media asset identified via a selectable menu in accordance with one embodiment.

FIG. 7 illustrates an exemplary web page 605 displayed in a browser 260 in accordance with another embodiment. Page elements 610A-B have been determined to be associated with media assets. In this embodiment, the media assets are identified via a selectable menu 710 associated with the page elements 610A-B. The menu 710 may comprise a collection of one or more selectable commands 715, each of which, when selected, may trigger one or more tasks, such as saving some or all media assets to a storage device, copying or sending a direct link to some or all media assets, or the like. In some embodiments, the user may activate the selectable menu 710 by accessing an import table that has been patched to allow access to said selectable menu 710, as described above.

Figure 8:
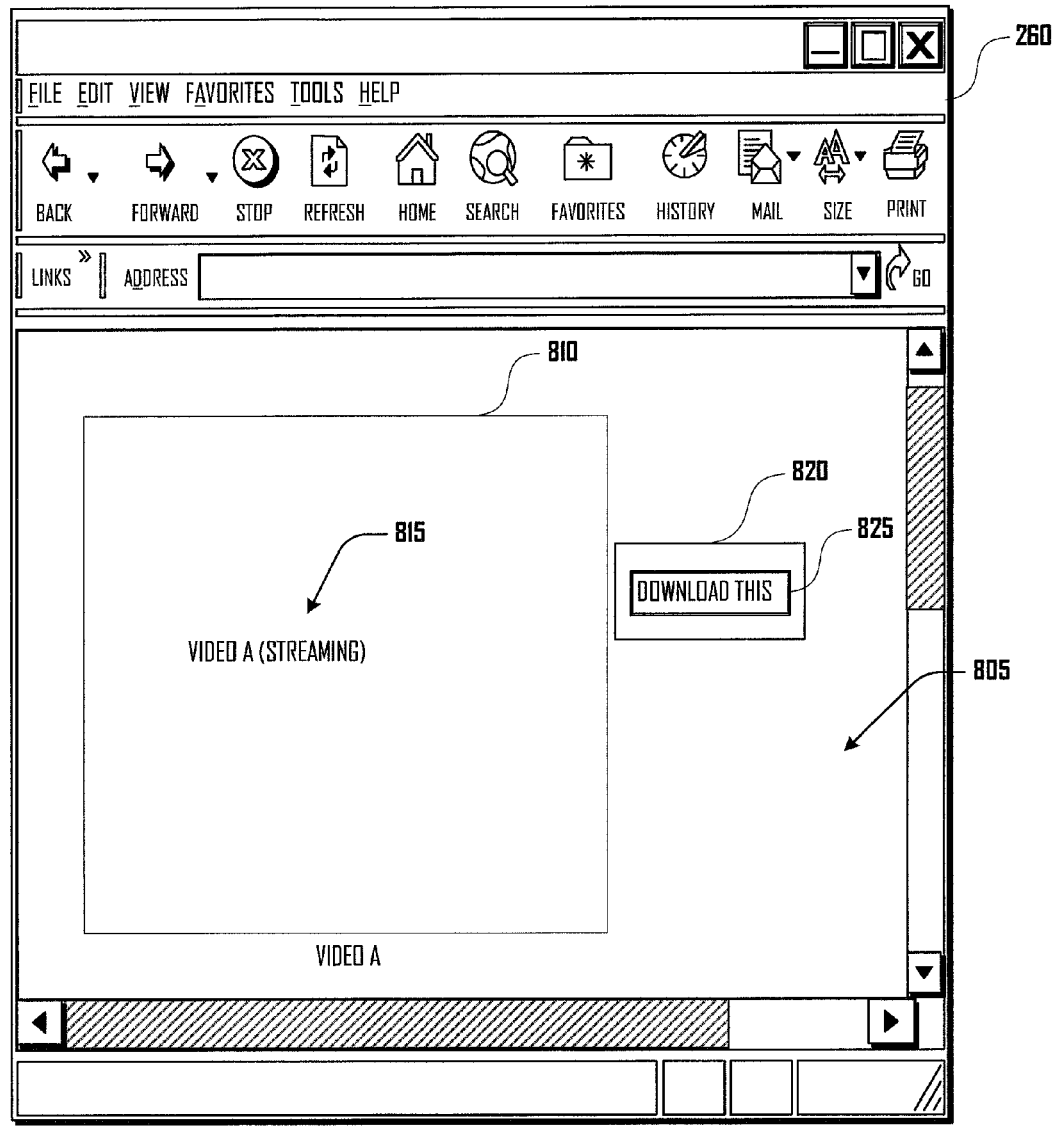
FIG. 8 is an illustration of a web page with a streaming media asset downloadable via a selectable element in accordance with one embodiment.

FIG. 8 illustrates an exemplary web page 805 displayed in a browser 260 in accordance with another embodiment. In one exemplary embodiment, page element 815 is a streaming media asset within a display portion 810 of the web page 805. In this embodiment, the streaming media asset 815 is identified as a page element that has a user interface component 820 with a selectable action element 825 to trigger a download of the media asset (separate from, but possibly contemporaneous with the streaming of the media asset). The user interface component 820 may comprise a collection of one or more selectable action element 825, each of which, when selected, may trigger one or more tasks, such as saving some or all media assets to a storage device, copying or sending a direct link to some or all media assets, or the like. In some embodiments, the user may activate the selectable action element 825 by accessing an import table that has been patched to allow access to said selectable action element 825, as described above.

Figure 9:
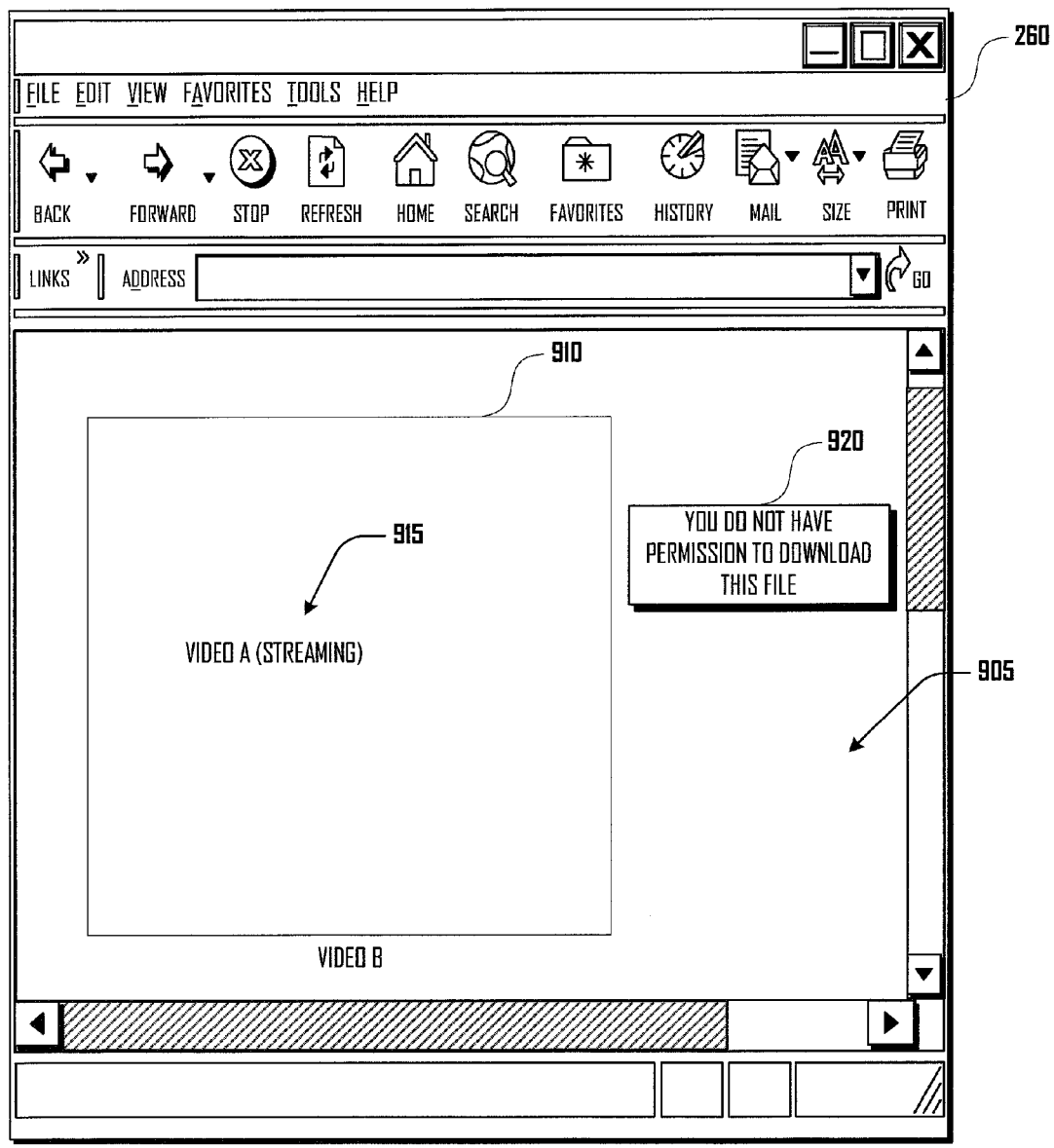
FIG. 9 is an illustration of a web page with a streaming media asset identified as non-downloadable in accordance with one embodiment.

FIG. 9 illustrates an exemplary web page 905 displayed in a browser 260 in accordance with another embodiment. In one exemplary embodiment, page element 915 is a streaming media asset within a display portion 910 of the web page 905. In this embodiment, the streaming media asset 915 is identified as a page element that would be downloadable, however, in this embodiment, the streaming media asset 915 has been indicated as non-downloadable. Accordingly, in such an embodiment a user interface component 920 is displayed indicating that the media asset is not downloadable. Various alternate embodiments may employ a variety of indications of non-downloadability. For example, some digital television protocols allow a "Broadcast Video Flag" to indicate that content should not be downloaded. Other systems, such as digital rights management ("DRM") systems or content encryption systems may also be employed to similar effect. In some embodiments, the web page 905 may contain indications that its page elements should not be downloaded (e.g., via a copyright notice with reserved rights, through meta-tags within the page, or the like).

Figure 10:
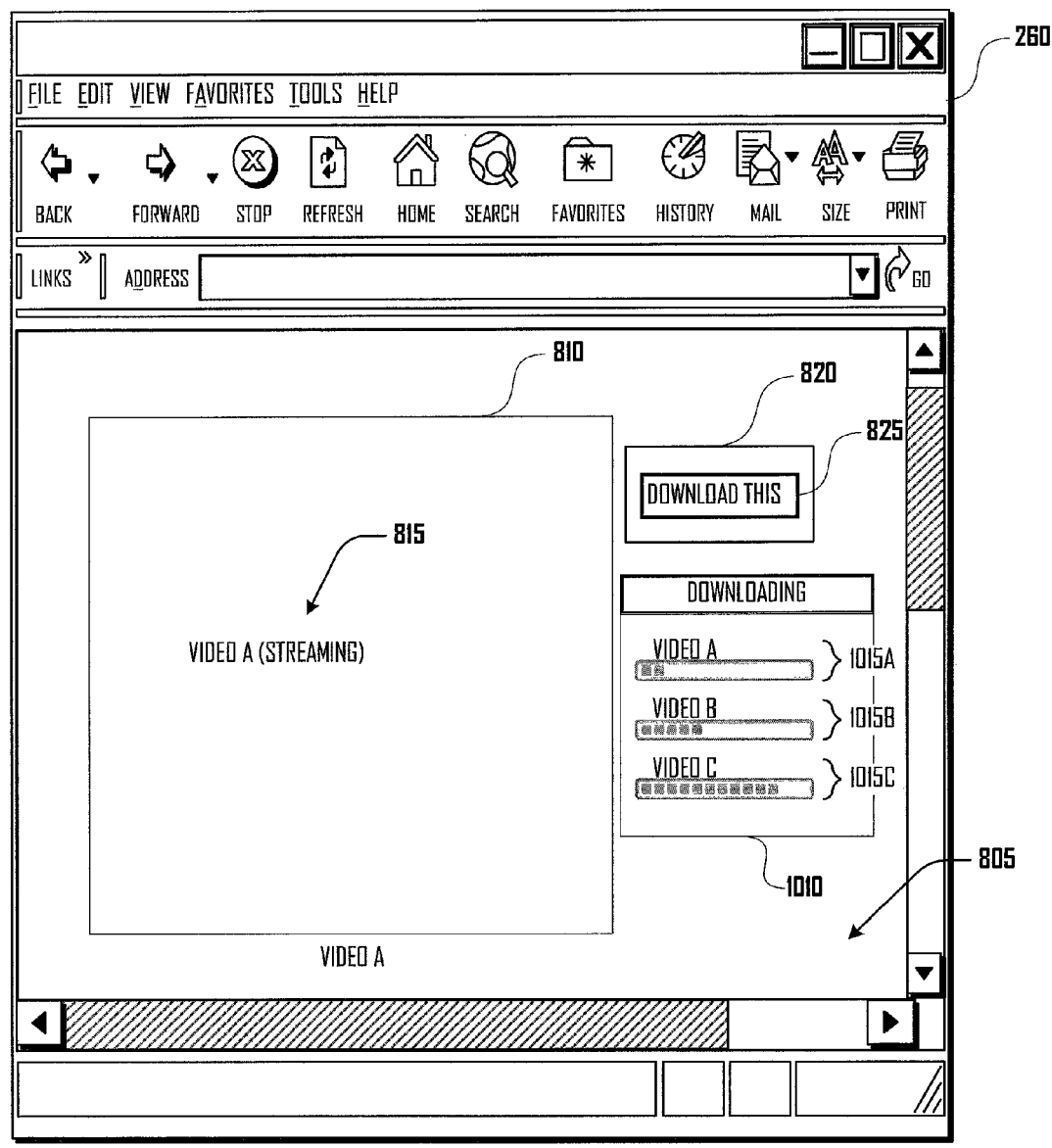
FIG. 10 is an illustration of a web page with a streaming media asset and contemporaneous downloads in accordance with one embodiment.

FIG. 10 illustrates an exemplary web page 805 displayed in a browser 260 in accordance with another embodiment. As described above, in one exemplary embodiment, page element 815 is a streaming media asset within a display portion 810 of the web page 805. In this embodiment, the streaming media asset 815 is identified as a page element that has a user interface component 820 with a selectable action element 825 to trigger a download of the media asset. Additionally, in FIG. 10, a download status component 1010 displays the current progress of multiple media asset downloads on progress elements 1015A-C. In various embodiments downloads can occur contemporaneously with the playback of the streaming media asset 815, may cause the streaming media asset playback to be paused, or even cancelled. In still further embodiments, multiple downloads may be limited such that they are queued up. For example, if a client device 200 does not have sufficient bandwidth to download, or is otherwise restricted to a predetermined number of downloads, selecting the selectable action element 825 may queue a download to occur at a future point when the client (or server) is no longer limited.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the embodiments discussed herein.

The invention claimed is:

1. A rendering device-implemented method of electronically tagging an online-retrievable media asset obfuscated by a media wrapper, the method comprising:

obtaining, by the rendering device from a web server, hypertext data corresponding to a renderable display page comprising a first plurality of page elements;

retrieving, via communications traffic between the rendering device and said web server, data corresponding to said first plurality of page elements according to said hypertext data;

identifying, according to an analysis of said communications traffic by the rendering device, a media asset of a content type that is obfuscated by a media wrapper;

analyzing, by the rendering device, page element characteristics of said first plurality of page elements;

identifying, by the rendering device according to said analyzed page element characteristics, one of said first plurality of page elements as corresponding to an obfuscating media wrapper associated with said identified media asset;

rendering said renderable display page by the rendering device according to said hypertext data; and adding, by the rendering device, to said rendered display page a tag to tag the identified page element, the tag associated with said obfuscating media wrapper, said tag facilitating a user of the rendering device to save said identified media asset to the rendering device for subsequent use, even though said media asset has been obfuscated by the media wrapper.

2. The method of claim 1 wherein said tag comprises a URI for said identified media asset, determined according to said analysis of said communications traffic.

3. The method of claim 2, further comprising determining whether said identified media asset is available via said URI, and wherein said tag further comprises a visual indication of said determined availability of said URI.

4. The method of claim 2 wherein said tag further comprises a triggerable interface for said URI.

5. The method of claim 4 further comprising triggering said tag.

6. The method of claim 5 wherein triggering said tag comprises accessing a patched import table.

7. The method of claim 1 wherein said obfuscating media wrapper comprises at least one of a JavaScript media player, a Flash media player, an ActiveX media player, and a VBScript media player.

8. The method of claim 1 wherein at least one of analyzing said page element characteristics and identifying said one of said plurality of page elements comprises traversing a document object model comprising said plurality of page elements.

9. The method of claim 1 wherein identifying said media asset of said content type that is obfuscated by a media wrapper comprises locating data objects conforming to at least one predetermined MIME type.

10. The method of claim 9 wherein the predetermined MIME type is a video MIME type.

11. A computing apparatus comprising a processor and a memory having executable instructions that when executed by the processor, perform the method of claim 1.

12. A computer readable medium comprising executable instructions that when executed by a processor, perform the method of claim 1.

* * * * *